United States Patent [19]
Murphy

[11] Patent Number: 5,913,917
[45] Date of Patent: Jun. 22, 1999

[54] FUEL CONSUMPTION ESTIMATION

[75] Inventor: Michael D. Murphy, San Jose, Calif.

[73] Assignee: Trimble Navigation Limited, Sunnyvale, Calif.

[21] Appl. No.: 08/906,175

[22] Filed: Aug. 4, 1997

[51] Int. Cl.⁶ .................................................. G01M 15/00
[52] U.S. Cl. ............................................. 701/123; 73/114
[58] Field of Search ................................... 701/102, 104, 701/123; 73/116, 117.2, 117.3, 113, 114

[56] References Cited

U.S. PATENT DOCUMENTS

| | | | |
|---|---|---|---|
| 3,665,086 | 5/1972 | Magee et al. | 35/10.2 |
| 4,217,644 | 8/1980 | Kato et al. | 701/123 |
| 4,400,779 | 8/1983 | Kosuge et al. | 701/123 |
| 4,470,296 | 9/1984 | Kobayashi et al. | 73/113 |
| 4,564,905 | 1/1986 | Masuda et al. | 701/123 |
| 4,845,630 | 7/1989 | Stephens | 701/123 |
| 5,216,623 | 6/1993 | Barrett et al. | 364/550 |
| 5,281,919 | 1/1994 | Palanisamy | 324/427 |
| 5,301,113 | 4/1994 | To et al. | 364/442 |
| 5,303,163 | 4/1994 | Ebaugh et al. | 364/550 |
| 5,315,235 | 5/1994 | Atherton et al. | 324/116 |
| 5,315,287 | 5/1994 | Sol | 340/455 |
| 5,317,269 | 5/1994 | Mills et al. | 324/427 |
| 5,321,616 | 6/1994 | Okuda et al. | 364/424.05 |
| 5,321,626 | 6/1994 | Palladino | 364/483 |
| 5,325,048 | 6/1994 | Longini | 324/74 |
| 5,335,188 | 8/1994 | Brisson | 364/551.01 |
| 5,359,528 | 10/1994 | Haendel et al. | 364/424.04 |
| 5,371,682 | 12/1994 | Levine et al. | 364/424 |
| 5,377,114 | 12/1994 | Gross | 364/465 |
| 5,434,508 | 7/1995 | Ishida | 324/427 |
| 5,459,666 | 10/1995 | Casper et al. | 364/442 |
| 5,487,002 | 1/1996 | Diller et al. | 364/424.01 |
| 5,505,076 | 4/1996 | Parkman et al. | 73/113 |
| 5,539,399 | 7/1996 | Takahira et al. | 340/995 |
| 5,578,748 | 11/1996 | Brehob et al. | 73/114 |
| 5,600,566 | 2/1997 | Park | 364/481 |
| 5,606,243 | 2/1997 | Sakai et al. | 320/48 |
| 5,608,324 | 3/1997 | Yoshida | 324/426 |
| 5,652,378 | 7/1997 | Dussault | 73/114 |
| 5,668,310 | 9/1997 | Parkman et al. | 73/113 |

OTHER PUBLICATIONS

Tom Logsdon, "The Navstar Global Positioning System," pp. 1–91, Van Nostrand Reinhold, 1992.

"Loran–C User Handbook," U.S. Department of Transportation, U.S. Coast Guard, Commandant Publication Pl6562.5, Nov. 1992.

*Primary Examiner*—George Dombroske
*Attorney, Agent, or Firm*—John F. Schipper

[57] ABSTRACT

Method and apparatus for prediction or estimation of fuel or energy consumption by a vehicle over a chosen trip route, where the route includes a plurality of road segments. Fuel consumption over each road segment is estimated, using information on one or more of the following variables: representative altitude of the road segment; representative slope of the road segment; estimated vehicle average speed along the road segment; length of the road segment; condition of the road segment; condition of the vehicle tires; expected vehicle traffic density along the road segment; applicable constraints on vehicle operation along the road segment; expected ambient weather conditions along the road segment; vehicle accessories that will be used; and vehicle driver profile information. Weather conditions enroute, such as local wind speed and direction, can be measured and used to enhance accuracy of predicted fuel consumption. Fuel consumption can be estimated initially, can be re-estimated enroute, using actual fuel consumption for the portion of the route already traveled, and can be estimated for a return trip along the same route. Fuel consumption can be estimated where the route is not initially specified. The fuel consumed may be electrical charge, gasoline, kerosene, natural gas, diesel fuel, or any similar fuel.

10 Claims, 9 Drawing Sheets

| Normal Trip Condition | Deviation | ΔFC(R) (per unit length trip) |
|---|---|---|
| 1. Terrain substantially level | 1. Terrain slop > + Slope | +a |
| 2. Terrain substantially level | 2. Terrain slope < -Slope | -a |
| 3. Normal fuel used | 3. Premium fuel used | -b |
| 4. Vehicle tires new | 4. Vehicle tires worn | +c |
| 5. Vehicle tire air pressure optimal | 5. Tire pressure not optimal | +d |
| 6. Average velocity in optimal range | 6. Average velocity outside optimal range | +e |
| 7. Vehicle traffic light/moderate | 7. Vehicle traffic heavy | +f |
| 8. No strong wind or dominant wind direction is present | 8. Strong wind opposing | +g |
| 9. No strong wind or dominant wind direction is present | 9. Strong wind favoring | -g |
| 10. No vehicle accessory used | 10. Vehicle heater used | +h |
| 11. No vehicle accessory used | 11. Vehicle air conditioner used | +i |
| 12. No vehicle accessory used | 12. Vehicle window partly open | +j (per window) |
| 13. No vehicle accessory used | 13. Vehicle window fully open | +k (per window) |
| 14. No vehicle accessory used | 14. Vehicle radio used | +l |
| 15. No vehicle accessory used | 15. Vehicle cellphone used | +m |
| 16. Mild ambient temperature | 16. Ambient temperature high | -n |
| 17. Mild ambient temperature | 17. Ambient temperature very low | +o |
| 18. Rain absent | 18. Rain present | +p |
| 19. Snow/ice absent | 19. Snow/ice present | +q |
| 20. Blizzard/hurricane absent | 20. Blizzard/hurricane present | +r |

FIG. 5

FUEL CONSUMPTION ESTIMATION

FIELD OF THE INVENTION

This invention relates to estimation of vehicle consumption of fuel or energy in moving from a first location to a second location along a prescribed route.

BACKGROUND OF THE INVENTION

As the cost of energy or fuel (e.g., electrical charge, gasoline, kerosene, natural gas or diesel fuel) inevitably increases over the next few decades, vehicle operators will become more concerned about consumption of fuel in moving from a first location, for example, the vehicle present location, to a second location. This will be especially true for a fuel such as electric charge, which is consumed relatively quickly due to the relatively small current capacity of an array of batteries using present technologies, and for which relatively few electrical recharge sources are available as yet. Presently, as many as 12 batteries are needed to provide sufficient electrical charge for a trip of modest length, such as 150 miles. If the day's activities include a series of shorter vehicle trips, it becomes important to determine whether all of these trips can be completed, given the constraint on electrical charge usage.

Several workers have disclosed systems for monitoring energy or fuel use, especially for limited storage capacity systems such as batteries. Examples of these systems are disclosed in U.S. Pat. No. 5,216,623, issued to Barrett et al, No. 5,281,919, issued to Palanisamy, No. 5,303,163, issued to Ebaugh et al, No. 5,315,235, issued to Atherton et al, No. 5,325,048, issued to Longini, No. 5,335,188, issued to Brisson, No. 5,377,114, issued to Gross, and No. 5,600,566, issued to Park.

Other workers have disclosed systems for predicting or estimating, usually in a limited environment, energy or fuel use over a specified time interval. Examples of these systems include U.S. Pat. No. 5,301,113, issued to To et al, No. 5,315,287, issued to Sol, No. 5,317,269, issued to Mills et al, No. 5,321,616, issued to Palladino, No. 5,371,682, issued to Levine et al, No. 5,459,666, issued to Casper et al, No. 5,487,002, No. 5,539,399, issued to Takahira et al, and No. 5,578,748, issued to Brehob et al.

Most of these systems assume a fixed and unchanging environment for prediction purposes and do not take account of the changing conditions a vehicle will encounter over the course of a selected route, such as change in elevation, type of road surface, number of road lanes, local traffic density, vehicle velocity, local temperature, local wind speed and other weather variables. Further, most such systems have no ability to modify a prediction of energy or fuel usage enroute, based upon conditions encountered over an initial portion of a route.

What is needed here is a system that analyzes a proposed vehicle route and proposed time interval of travel and provides a prediction or estimation of the electrical charge or conventional fuel that will be consumed in traveling over that route. Preferably, the system will take account of changes in vehicle elevation and vehicle velocity, expected traffic conditions and traffic density and expected or actual weather conditions in providing this prediction or estimation. Preferably, this system will allow a re-estimation of fuel usage enroute, after an arbitrary portion of the route has been covered.

SUMMARY OF THE INVENTION

These needs are met by the invention, which provides a system, method and apparatus for estimating or predicting the fuel or energy (referred to collectively as "fuel" herein) that a vehicle will consume in moving from a selected first location L1 to a selected second location L2 along a selected route R, using a fuel consumption function, also referred to here as a cost function, associated with each of several road segments that together make up the route R. Each road segment has associated with it: a range of location coordinates, a representative elevation, a representative road slope relative to a local horizontal plane, a road segment class (speed limit, number of vehicle lanes, etc.), constraints on road segment use (turn restrictions and lane use restrictions for a given time and day of the week, etc.) and other variables. The trip itself has associated with it: a time interval and day of the week, expected local weather conditions and other variables that are expected to prevail along the route R. Predicted fuel consumption is estimated initially by computing the fuel consumption increment for each road segment that makes up the route and adding these increments.

Alternatively, predicted fuel consumption for the trip can be computed enroute by determining fuel consumption for the portion of the route already covered and adding this to the predicted fuel consumption for the remainder of the route.

Alternatively, fuel consumption can be determined for each of one or more road segments that make up a route (from location A to location B), which may include changes in elevation and other route and environmental modifications from a normalized route; and fuel consumption for the reverse route (from B to A) can be predicted, taking into account elevation changes and the other modifications.

Alternatively, fuel consumption for a given route can be determined, beginning with a reference fuel consumption value for that route and adding and/or subtracting increments determined by deviation of the expected trip conditions from reference trip conditions used for the reference value.

Alternatively, a "routeless" or "destinationless approach, not requiring initial specification of route or of destination, can be used to predict fuel consumption.

This invention takes into account the most important variables affecting fuel consumption on each of a plurality of road segments. The invention can be used to determine which of several candidate routes is optimal, based upon fuel consumption, or may be used to predict actual fuel consumption for a trip to be taken by a selected route or for a return trip route.

BRIEF DESCRIPTION OF THE DRAWINGS

FIG. 5 illustrates a cost table that can be used with the invention.

DESCRIPTION OF BEST MODES OF THE INVENTION

Figure 1:
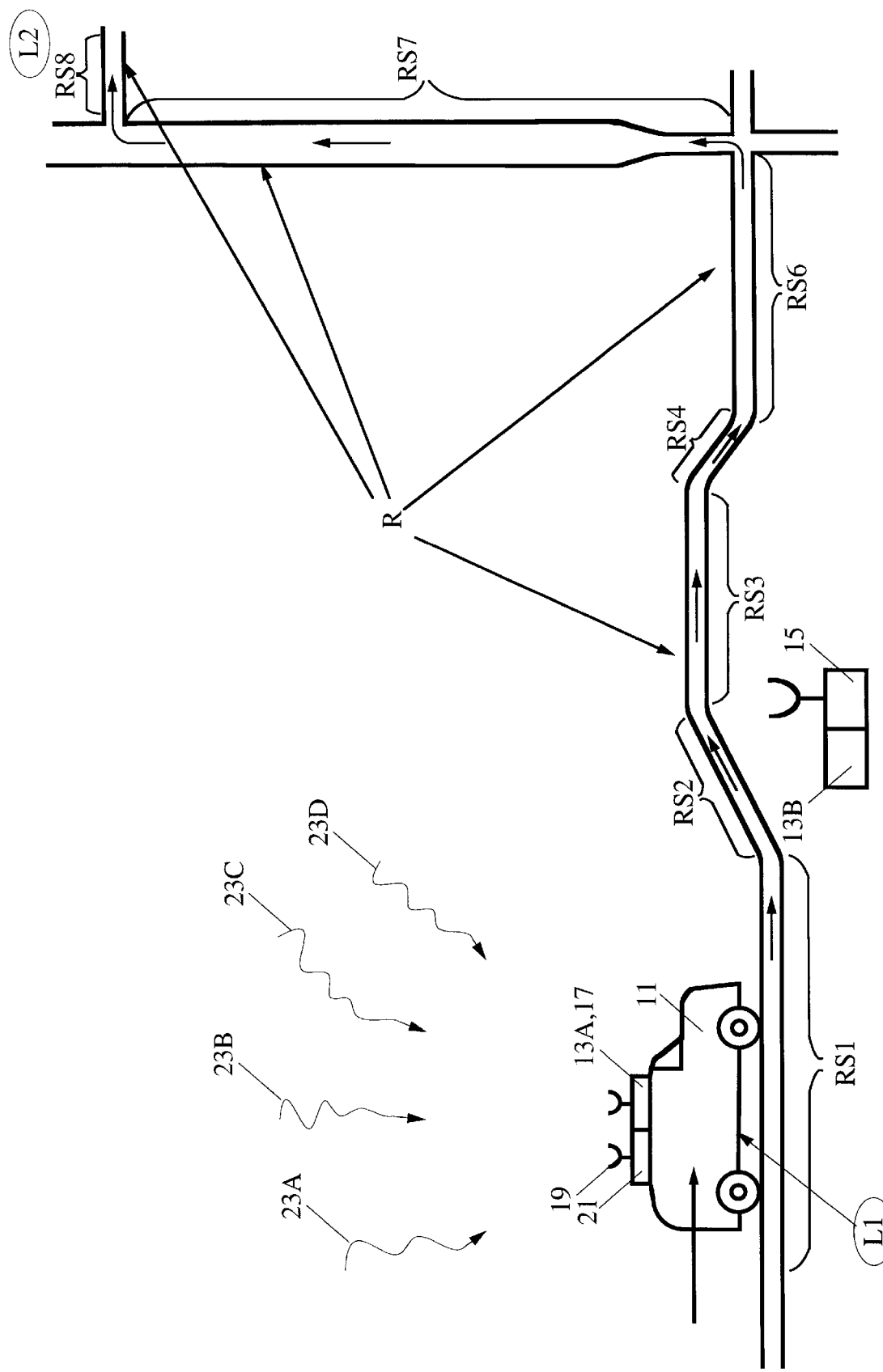
FIGS. 1 illustrates an environment for practicing the invention.

FIG. 1 illustrates use of the invention in one embodiment. An operator of a vehicle 11 wishes to travel along a selected route R from a selected first location L1, which may but need not coincide with the vehicle present location, to a selected second location L2, beginning at a selected time on a selected day of the week; and the vehicle operator wishes to estimate or predict fuel consumption for this trip. The route R may be chosen by the vehicle operator or by another entity or may be chosen as an optimal route on the basis of an associated merit function, such as (i) least time consumed, (ii) shortest route, (iii) least fuel consumed, or (iv) some other suitable merit function. Estimation of vehicle fuel consumption for the trip along the route R may be made by a programmed microprocessor 13A that is carried on or in the vehicle 11; or such information may be provided by a programmed microprocessor 13B that is located elsewhere (not on or in the vehicle), with the fuel consumption estimation and/or route information being transmitted to the vehicle operator by a signal transmitter 15 and received at the vehicle by a signal receiver 17 carried on or in the vehicle 11.

Estimation of vehicle fuel consumption may be made by a programmed microprocessor by the following approach. The route R is first decomposed into a sequence of road segments RSk (k=1, 2, ..., K; K≥2) that are connected end-to-end along the route, where each road segment preferably: (1) is continuous; (2) either has an approximately constant elevation or an approximately constant slope relative to a locally horizontal plane; (3) includes at most one intersection of two or more roads; (4) includes a portion of a route having at most one (posted) vehicle speed limit; (5) is long enough to allow use of a representative vehicle speed along that road segment; (6) has a constant number of vehicle lanes allocated to vehicle traffic in the direction the vehicle 11 will travel along the route R; and/or (7) has the same (uniform) traffic constraints imposed throughout that road segment.

Vehicle fuel consumption FC along a given road segment RSk may depend upon any or all of the following fuel consumption factors: (1) road segment elevation $H_k$ or road segment slope $Slope_k$ and average elevation $H_{k,avg}$; (2) representative or average vehicle speed $V_k$; (3) speed limit $V_{k,max}$, if any, along that road segment length; (4) vehicle turn constraints and/or vehicle lane constraints $VC_k$, if any, imposed on traffic on that road segment on the day and at the time of day the trip is made; (5) expected vehicle traffic density $VTD_k$ along that road segment on the day and at the time of day the trip is made; (6) number of vehicle lanes $VL_k$ assigned to traffic along that road segment on the day and at the time of day the trip is made; (7) expected weather conditions $W_k$ (including temperature, road dryness and direction/intensity of local winds) along that road segment on the day and at the time of day the trip is made; (8) vehicle accessories $A_{m,k}$ used during the trip (air conditioning or heating activated, radio activated, etc.); (9) road segment length $RSL_k$; and (10) vehicle driver profile $VDP_k$ for the road segment RSk. The fuel consumption function for a road segment RSk may be expressed as $$FC(RSk;est)=FC(H_k,H_{k,avg},Slope_k,V_k,V_{k,max},VC_k,VTD_k,VL_k,W_k, I(t';A_{k,m}),RSL_k,VDP_k). \quad (1)$$

Vehicle fuel consumption for the entire trip is then estimated as $$FC(\text{trip}) = \sum_{k=1}^{K} FC(RSk; est). \quad (2)$$

Alternatively, the microprocessor 13A or 13B can be programmed to determine the actual fuel consumption FC(RSk;actual) for each of a first group of road segments RS1, RS2, ..., RSM already traveled, to estimate fuel consumption for each of the remaining road segments RS(M+1) (e.g., present vehicle location), RS(M+2), ..., RSK on the chosen route and to estimate fuel consumption enroute for the entire trip as $$FC(\text{trip}) = \sum_{k=1}^{M} FC(RSk; \text{actual}) + \sum_{k=M+1}^{N} FC(RSk; est). \quad (3)$$

This last estimate, a sum of actual fuel consumption for a first portion of a route plus estimated fuel consumption for the remainder of the route, is likely to have enhanced accuracy relative to an initial estimate of fuel consumption, such as set forth in Eq. (2).

Figure 2:
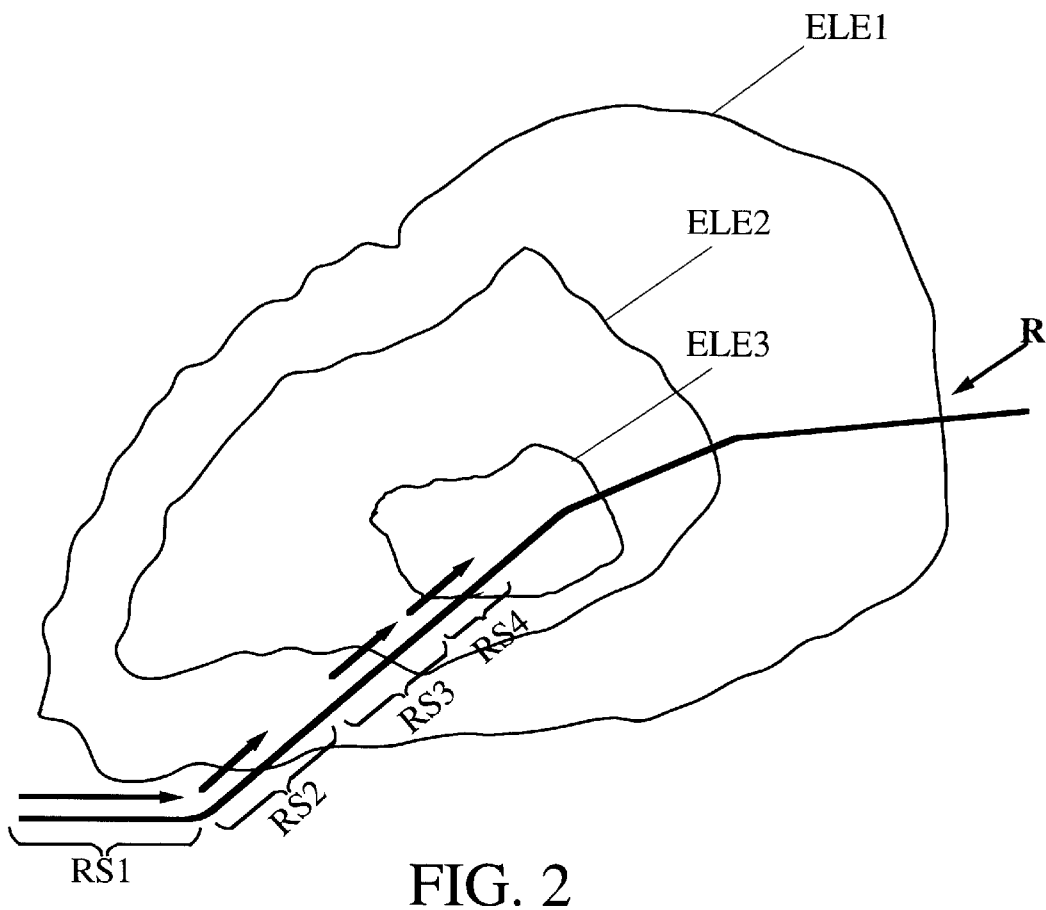
FIG. 2 illustrates a terrain map that can be used with the invention.

FIG. 2 is a topographic view of an environment similar to that of FIG. 1, through which a route R passes. Each of the curves ELE1, ELE2 and ELE3 represents a distinct topographic or terrain elevation level, relative to sea level or some other standard elevation, for example, the elevations 130 feet, 140 feet and 150 feet, respectively. A first route segment RS1 might be located on sloping terrain having an average elevation equal to ELE01=(ELE0+ELE1)/2, with approximate slope equal to Slope1, which may be zero in some circumstances, in the indicated road segment direction. A second route segment RS2 might be located on terrain having an average elevation ELE12=(ELE1+ELE2)/2, with approximate slope equal to Slope2. A third route segment RS3 might be located on terrain having an average elevation ELE23=(ELE2+ELE3)/2, with approximate slope equal to Slope3. This elevation and slope characterization process is continued for the entire route, considered as a collection of connected road segments RSi (i =1, 2, ..., M).

Optionally, the topography in a region through which the chosen route passes may be represented by a digitized terrain map that associates with each of a sequence of horizontal coordinate pairs $(x_n,y_n)$ a corresponding height $z_d(x_n,y_n)$ lying above or below a standard elevation. The local topography may be modeled as a two-dimensional surface with a surface height $z=z(x,y)$ that approximates the digitized terrain height $\{z_d(x_n,y_n)\}$. If this modeling is carried out, a road segment RSk may extend from a location with coordinates (xk,yk) to a location with coordinates (x(k+1),y(k+1)) and may be defined parametrically by equations such as $$x=x(s), \quad (4A)$$

$$y=y(s) \; (s(k) \leq s \leq s(k+1)), \quad (4B)$$

$$x(s(j))=xj, \quad (5A)$$

$$y(s(j))=yj \; (j=k,k+1), \quad (5B)$$

where s is a parameter used to generate the curve representing the road segment RSk. A road segment curve or line RSk is then imposed upon the topographical surface z=z(x,y) to produce a three-dimensional curve z(s)=z(x(s), y(s)) for $s(k) \leq s \leq s(k+1)$, for that portion of the route R. If the surface elevation, $$z(s)=z(x(s),y(s)), \quad (6)$$

is monotonically changing (increasing or decreasing), a representative slope for the road segment RSk can be defined by any of the prescriptions $$\text{Slope}_k = \{z(s(k+1))-z(s(k))\}/\Delta d(k), \quad (7A)$$

or $$\text{Slope}_k = (dz/ds)_{k,avg}, \quad (7B)$$

where $$\Delta d(k) = \{(x(s(k+1))-x(s(k)))^2 + (y(s(k+1))-y(s(k)))^2\}^{1/2}, \quad (8)$$

and $(dz/ds)_{k,avg}$ is a suitable geometric average of the slope of the curve $z(s)$ over the parameter values $s(k) \leq s \leq s(k+1)$. A representative or average elevation for the road segment RSk may be defined by $$H_{k,avg} = \left\{ \int_{s(k)}^{s(k+1)} z(s')ds' \right\} / \{s(k+1)-s(k)\}, \quad (9)$$

or by some other suitable definition that takes account of variations in the not-necessarily-monotonic surface elevation $z(s)$ along the curve representing the road segment RSk.

Estimated fuel consumption along the road segment RSk due to changing road elevation may be a sum of two components. The first component, $$\Delta FC(1) = \psi(H_{k,avg}, V_k) \cdot RSL_k, \quad (10)$$

is an estimate of fuel consumption over a road segment of length $RSL_k$ at the representative elevation $H_k$ and representative vehicle velocity $V_k$ for the road segment. This first component is modeled, based on the vehicle engine, vehicle mass including mass of passenger(s) (including driver) and of any vehicle "payload", tire pressure, tire-roadbed friction and expected vehicle velocity $V_k$ along the road segment RSk. If vehicle velocity $V_k$ is approximately constant over the road segment RSk, it is possible to model the multiplicative factor $\psi(H_{k,avg}, V_k)$ as a polynomial, such as $$\Psi(H_{k,avg}, V_k) = \Psi(H_{k,avg})_0 + \Psi(H_{k,avg})_1 \cdot V_k + \Psi(H_{k,avg})_2 \cdot (V_k)^2, \quad (11)$$

where the coefficients $\psi(H_{k,avg})_i$ (i=0, 1, 2, . . . ) may be determined empirically. For a gasoline powered engine, where a particular positive velocity is likely to provide the best "gas mileage," the coefficients $\psi(H_{k,avg})_1$ and $\psi(H_{k,avg})_2$ are likely to be negative and positive, respectively, if the vehicle has an optimum non-zero velocity V(opt). For an electrically powered engine, where engine efficiency is likely to monotonically decrease with increasing current or vehicle velocity, the coefficient $\psi(H_{k,avg})_1$ is likely to be positive.

The second component in the sum arises primarily from changing road elevation. One estimate of this second component is fuel/energy consumption or saving $\Delta FC$ in moving a vehicle with mass m(vehicle) over a road segment RSk with monotonically changing elevation, from an initial elevation, $z=z(sk)$, to a final elevation, $z=z(s(k+1))$, namely $$\Delta FC(2) = m(\text{vehicle}) \cdot g \cdot \{z(s(k+1))-z(s(k))\} \cdot \Phi \cdot (\eta(V_k, H_{k,avg}))^{-1}, \quad (12)$$

where g is the local gravitational constant, $\eta(V_k, H_{k,avg})$ is engine efficiency for vehicle velocity $V_k$ and vehicle average elevation $H_{k,avg}$ and $\Phi$ is a multiplier factor, usually greater than 1.0, that converts minimum energy usage or saving to actual energy usage or saving for the change in elevation. The second component, fuel/energy consumption or saving, $\Delta FC(2)$, determined in Eq. (12) can be positive or negative, depending upon a representative slope of the road segment RSk. If the road segment elevation is not monotonically changing, the term $\{z(s(k+1))-z(s(k))\}$ in Eq. (12) is replaced by a sum of terms $\{z(s'(k'+1))-z(s'(k'))\}$, where $z(s'(1'))=z(s(k)) < z(s'(2')) < \ldots < z(s'(n'))=z(s(k+1))$, that take account of each sub-segment of the road segment RSk for which the elevation is monotonically changing.

Figure 3:
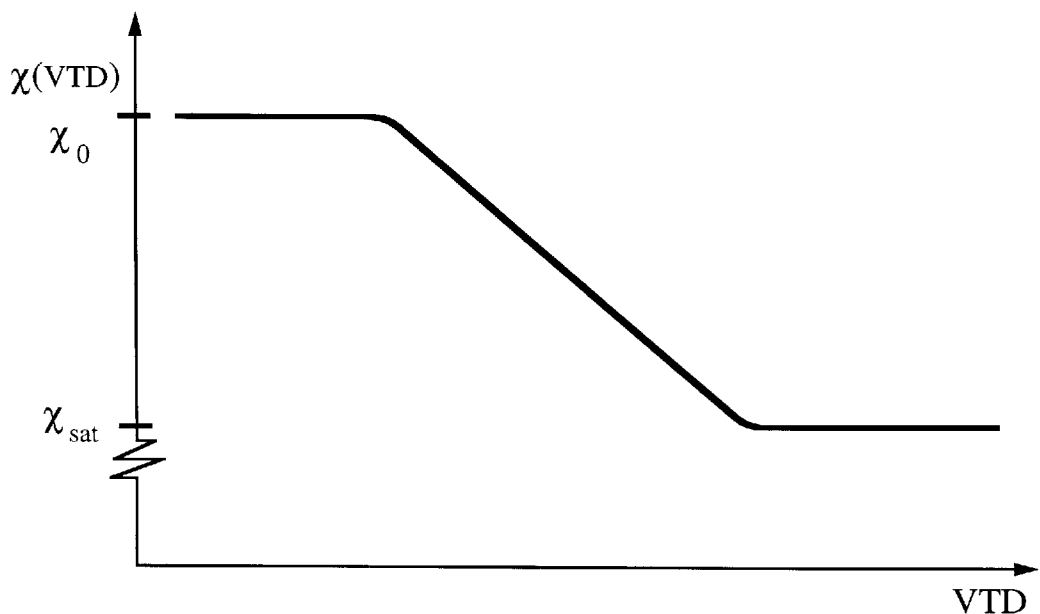
FIG. 3 is a graphic view illustrating a decrease of expected average vehicle speed on a given road segment as vehicle traffic density increases.

An average or expected vehicle velocity $V_k$ along the road segment RSk may be taken to be a fraction $\chi$ of the applicable speed limit along that road segment. More realistically, the expected vehicle velocity $V_k$ will be a fraction $\chi(VTD_k, k)$, where $VTD_k$ is an expected vehicle traffic density along the road segment RSk. The fraction $\chi(VTD_k, k)$ will be monotonically decreasing for increasing values of $VTD_k$, as illustrated in FIG. 3, where the fraction $\chi$ decreases from a value $\chi 0$ at low vehicle traffic density to a much lower value $\chi(sat)$ at high vehicle traffic density. The fraction $\chi(VTD_k, k)$ may be multiplied by the applicable maximum speed limit $V_{k,max}$ for that road segment or by some other appropriate vehicle speed, which may be greater than or less than the applicable speed limit.

A characterization of vehicle constraints $VC_k$ and of number of available vehicle lanes $VL_k$, applicable to the road segment RSk, will depend upon the day of the week and the time of day the vehicle will travel along the road segment RSk. If the road segment RSk requires a right or left turn at an intersection, this turn may be restricted or prohibited at certain times of day and/or during certain days of the week. For example, a turn may be prohibited on week days between the hours of 6:30–9:30 a.m. and 3:30–6:30 p.m. The number of vehicle lanes available for vehicle travel in a given direction on the road segment RSk may also vary with the time of the day and/or day of the week. For example, vehicle parking may be permitted in a side lane during the hours of 9:00 a.m.–4:00 p.m. and 7:00 p.m.–6:00 a.m. on weekdays so that a side lane is not available for vehicle travel during these hours.

Prohibition of a turn at a particular intersection during particular hours should be incorporated into whatever formal procedure is used to determine a route that is likely to rely upon such turn. A candidate route that relies upon this turn during times that a turn prohibition is effective would be dropped from consideration. A road segment RSk, for which one or more lanes are not available for vehicle travel during particular hours, may have its vehicle traffic density $VTD_k$ increased by a multiplicative factor $f_k$ that is approximately the ratio of the maximum number of lanes available for vehicle travel in the given direction divided by the number of lanes available when fewer lanes are allocated, which is defined as $$f_k = \{\text{max number of lanes available for road segment RSk}\}/\{\text{number of lanes available for road segment RSk with fewer lanes allocated}\}. \quad (13)$$

The ambient weather conditions factor $W_k$ for the road segment RSk may apply generally to all road segments, or this factor may be specially determined for certain road segments where particular weather decreases the expected average vehicle speed on those road segments. The ambient weather factor $f_k$ may be a multiplicative factor ($0 < f_k \leq 1$) that is multiplied by the average vehicle speed otherwise expected on the road segment RSk for the local weather actually present, or predicted to be present, when a vehicle travels on this road segment, that is $$V_{k,expected} = f_k \cdot V_k. \quad (14)$$

Use of a vehicle accessory, such as air conditioning or space heating or a vehicle radio or cellular phone, may have a substantial effect on electrical charge consumed in an electrical vehicle, through loss of power to move the vehicle and through draw-down of electrical charge from a finite source, the vehicle batteries. Where conventional fuel (gasoline, etc.) is used to power the vehicle, motional power loss will be substantial for use of air conditioning but will be modest or negligible for use of space heating or of a vehicle radio. For an electrical vehicle, the consumption of electrical charge by use of a vehicle accessory (number m), $A_{m,k}$, on the road segment RSk may be estimated by a time integral $$\Delta FC(A_{m,k}) = \int_{t0}^{t1} I(t'; A_{m,k}) dt' \quad (15)$$

of the electrical charge drawn by use of that accessory while the vehicle travels over the road segment RSk. For use of space heating or of a radio, the electrical current is approximately constant so that $I(t'; A_{m,k})$ will be approximately constant. Electrical current used for air conditioning will vary with the ambient temperature and humidity outside the vehicle and the selected temperature inside the vehicle so that $I(t'; A_{m,k})$ will depend upon the expected weather conditions and upon the vehicle driver's choice of interior temperature. Similar considerations will apply to use of a vehicle accessory in a vehicle that uses conventional fuel.

Length of a road segment, $RSL_k$, may be approximated by the quantity $\Delta d(k)$ in Eq. (8). Preferably, the length $RSL_k$ is determined using the general relation $$RSL_k = \int_{s(k)}^{s(k+1)} \left\{ (dx/ds)^2 + (dy/ds)^2 + (dz/ds)^2 \right\}^{1/2} ds, \quad (16)$$

$$dz/ds = (dz/dx)(dx/ds) + (dz/dy)(dy/ds) \quad (17)$$

where the parametric equations (4A), (4B), (5A), (5B), and (6) are used in the computation of $RSL_k$ in Eq. (16). A fuel consumption rate, dFC/ds is computed using the preceding equations and modeling, and a fuel consumption increment for the road segment RSk may be expressed as $$FC(RSk; est) = \int_{s(k)}^{s(k+1)} (dFC/ds) \quad (18)$$

$$\left\{ (dx/ds)^2 + (dy/ds)^2 + (dz/ds)^2 \right\}^{1/2} ds.$$

The computed fuel consumption increment FC(RSk;est) is then used in Eq. (2) and/or Eq. (3) to estimate the fuel consumption for the chosen route R. For the purposes of Eqs. (16), (17) and (18), the parametric quantities x(s), y(s) and z(x(s),y(s)) are assumed to be differentiable in their respective variables.

The vehicle driver profile, $VDP_k$, for a particular road segment RSk will take into account such variables as: (1) whether the vehicle driver holds a constant velocity or adopts another approach, when the vehicle moves up or down a hill or around a curve; (2) how quickly or gently the driver brings the vehicle to a stop at a stop sign or traffic light; (3) how quickly or slowly the driver accelerates after the vehicle stops at a stop sign or traffic light or traffic obstruction; (4) the velocity at which the driver moves on a normal road segment; and (5) whether the driver (or passenger) tends to drive with one or more vehicle windows open in weather that is similar to the ambient weather. Ideally, these driver characteristics are taken into account in estimating fuel consumption along a given road segment. If the vehicle driver brings the vehicle abruptly to a stop at, and accelerates quickly away from, a stop sign or traffic light, fuel consumption will be increased by a computed increment $\Delta FC(VDP_k;1)$ by these maneuvers, especially if the vehicle uses regenerative braking to restore a portion of the already electrical charge used by the vehicle. Fuel consumption will also be increased by a computed increment $\Delta FC(VDP_k;2)$, if the driver typically drives at speeds much greater than the optimum vehicle speed V(opt), or if the driver or a passenger typically drives with one or more vehicle windows partly or fully open.

In one approach, the predicted or estimated fuel consumption for a monotonic road segment RSk (elevation constant or increasing, or elevation constant or decreasing, over the length of the road segment) may be expressed as the sum of the expressions in Eqs. (10) and (12)

$$\Delta FC(RSk) = \psi(H_{k,avg}, V_k, VC_k, VTD_k, VL_k, W_k, A_{m,k}, VDP_k) \cdot RSL_k + m(\text{vehicle}) \cdot g \cdot \{z(s(k+1)) - z(sk)\} \cdot \Phi(\eta(V_k, H_{k,avg}))^{-1}), \quad (19)$$

where the term $\psi(H_{k,avg}, V_k, VC_k, VTD_k, VL_k, W_k, A_{m,k}, VDP_k)$ now depends upon the average elevation or altitude $H_{k,avg}$, the representative vehicle velocity $V_k$, the vehicle turn and/or land constraints $VC_k$, the vehicle traffic density $VTD_k$, the number of vehicle lanes available $VL_k$, and the expected weather conditions $W_k$ applicable to the road segment RSk. The engine efficiency $\eta(V_k, H_{k,avg})$ in Eq. (19) may also depend upon these other parameters.

For an electrically powered vehicle, fuel usage over a given time interval is the integral with respect to time of electrical current, measured in amperes, over that time interval. Alternatively, fuel usage over a given road length is the integral with respect to distance (dx) of electrical current divided by vehicle velocity (assumed to be positive). For conventional fuel, such as gasoline, kerosene, natural gas or diesel fuel, fuel usage over a given time interval is the integral with respect to time of fuel usage rate, usually measured in fuel volume per unit time, over that time interval. The system may be used to estimate or predict whether the vehicle has sufficient fuel on board to travel over the route R from the first location L1 to the second location L2 (FIG. 1) or may be used to compare fuel usage over two or more alternative routes to determine an optimum route.

Figure 4:
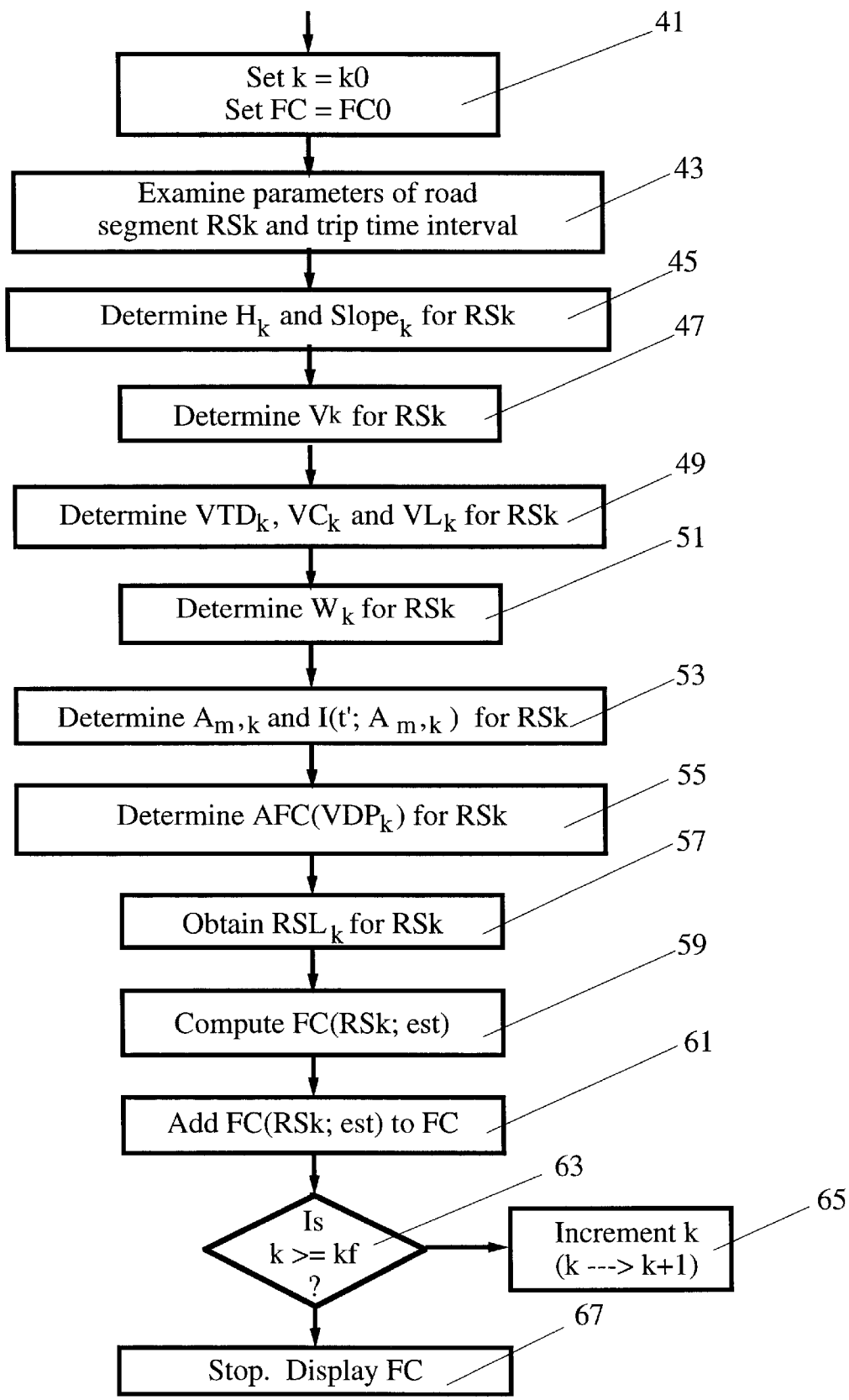
FIGS. 4, 6, 7, 8 and 9 are flow charts illustrating procedures for estimating or predicting fuel consumption according to the invention.

FIG. 4 is a flow chart of a suitable procedure for estimating fuel consumption of a given route according to the invention. This assumes that a route R has been chosen and that the route is already decomposed into a sequence of road segments that together make up the chosen route. In step 41, a road segment index k is set equal to its initial value, k=k0, and a fuel consumption estimate is set equal to a fuel consumption initial value FC0. The quantity FC0 may be taken to be the value of the first sum on the right hand side in Eq. (3), for example, if the vehicle has already traveled a portion of the route R.

In step 43, parameters associated with the road segment RSk are examined. In step 45, a representative elevation $H_k$ and representative slope $Slope_k$ for the road segment RSk are determined. In step 47, a representative value of vehicle velocity, $V_k$, is determined for road segment RSk. In step 49, representative vehicle traffic density $VTD_k$, vehicle constraints $VC_k$, and vehicle lanes available $VL_k$ are determined for that road segment RSk for the particular time of day and day of the week will occur, as discussed above. In step 51, the expected weather conditions for the road segment RSk, or for all the road segments that are part of the route R, are determined and used to compute a weather condition factor $W_k$ (optional).

In step 53, if a vehicle accessory $A_{m,k}$ is expected to be activated along the road segment RSk, an estimated fuel consumption increment $\Delta FC(A_{m,k})$ for activation of that accessory (number m) along the road segment RSk is computed, using Eq. (15). In step 55, a fuel consumption $\Delta FC(VDP_k)$, dependent upon the vehicle driver profile $VDP_k$, is computed.

In step 57, the road segment length $RSL_k$ is obtained for the road segment RSk. Determination of some of the parameters $H_k$, $Slope_k$, $V_k$, $VTD_k$, $VC_k$, $VL_k$, $W_k$, $I(t';A_{m,k})$, $VDP_k$ and $RSL_k$ can be included or omitted, depending upon the complexity of the method used to calculate FC(RSk;est).

In step 59, fuel consumption FC(RSk;est) for the road segment RSk is computed approximately, using the road segment length approximation set forth in Eq. (8) or (14), or is computed more exactly, using the fuel consumption increment determined as in Eq. (15). In step 61, the value FC(RSk;est) is added to the fuel consumption estimate. In step 63, the system determines whether the road segment index k is at least equal to a final index value, k=kf. If k<kf, the index k is incremented (k→k+1) in step 65, and the system returns to step 43 to compute FC(RS(k+1);est).

If k≥kf, the system stops computing the fuel consumption increments FC(RSk;est), in step 67, and optionally displays FC. The value in the fuel consumption estimate is now the fuel consumption estimate for the trip, FC(trip),whether computed using Eq. (2) (with FCO=0) or using Eq. (3).

Where fuel consumption is to be predicted enroute, the vehicle 11 is preferably provided with a mechanism for determining the vehicle present location along the route R. Vehicle present location may be determined using a location determination (LD) signal antenna 19 and associated LD signal receiver 21 that are carried on or in the vehicle 11. The LD antenna 19 receives LD signals 23A, 23B, 23C and 23D from two, three, four or more LD signal sources and passes these LD signals to the LD receiver 21, which processes these signals and determines the present location of the LD antenna 19, in a manner well known in the art.

For enroute prediction of fuel consumption, the vehicle 11 in FIG. 1 may be provided with one or more an array of one or more Pitot tubes or other air speed sensing devices 18A, 18B, 18C, is mounted on the vehicle 11, where the tubes are oriented in different directions to determine the local air velocity vector $v_{air}$ and local air pressure $p_{air}$ for the region the vehicle is presently passing through. The present vehicle velocity vector v is subtracted from local air velocity vector $v_{air}$ sensed by the Pitot tube array to provide an approximate determination of "static" air speed $$v_{a,s} = v_{air} - v \qquad (20)$$

in the absence of vehicle motion. The direction and magnitude of static air velocity is then accounted for in determining a difference between actual fuel consumption and predicted fuel consumption for the road segment RSk the vehicle 11 presently travels upon. Optionally, the silhouette of the vehicle 11 may be tested and assigned a function $\Delta FC(v,v_{a,s})$ that provides an estimate of increase or decrease of fuel consumption, per unit time or per unit length traveled, depending upon the vehicle velocity vector v and the local static air speed $v_{a,s}$. This estimate can be applied to each road segment RSk that is yet to be traveled over on the remainder of the route R to obtain an improved estimate of the fuel consumption enroute, as determined in Eq. (3). The presently determined static air speed $v_{a,s}$ may be assumed to be present for a selected number of forward consecutive road segments, beginning with the present road segment RSk, where this selected number is either a fixed number, or is the equivalent of a fixed length (e.g., the next 1–5 miles or the next 1600–8000 meters), or is chosen to correspond to a change in elevation of no more than a few hundred meters.

As an alternative approach, a normalized fuel prediction model, providing an estimate of fuel consumption in a normalized or idealized situation, may be used as an initial estimate of fuel consumption for the route, or for the remainder of the route that has not yet been covered. This normalized fuel consumption is then added to or subtracted from, based on the various trip or route parameters in Eq. (19) that differ from the normalized situation. This use of normalized fuel consumption as an initial estimate can be applied to the full route estimate, which is usually made before the trip begins, or to an enroute prediction for the remainder of the trip. An enroute estimation might be used, for example, to determine if the remainder of the route (not yet covered by the vehicle) can be completed without refueling. A generic, normalized estimate of fuel consumption may be used for all vehicle drivers, or a different normalized estimate of fuel consumption may be used for each of one or more identified vehicle drivers, if the vehicle driver profile is an important consideration.

This approach begins with a reference fuel consumption value FC0(R) for a selected route R, where the reference value FC0 typically assumes the following reference trip requirements: (1) the terrain for the route R is substantially level, with no road segment having a slope magnitude more than a small slope threshold $Slope_{thr}$ (e.g., $Slope_{thr} = 0.01–0.05$); (2) the vehicle fuel used (e.g., electric charge, gasoline, kerosene, natural gas or diesel fuel) provides a specified reference mileage (e.g., 17 miles per gallon or 1 kilometer per Coulomb); (3) the vehicle tires are substantially new; (4) tire pressure is close to its optimal value; (5) roadbed condition is of normal quality; (6) vehicle average velocity over the route R lies in a specified optimal range between a lower limit average $V_{avg,min}$ and an upper limit average $V_{avg,max}$ (e.g., 22–30 miles per hour); (7) vehicle traffic along the route R is light to average; (8) no specified vehicle accessories, such as heating, air conditioning, a vehicle open window, a vehicle radio or a vehicle cellular phone, are activated on the trip; (9) no strong wind or dominant wind direction is present; (10) the ambient temperature and other extant weather characteristics are mild; and (11) profile of the driver shows no unusual vehicle operation tendencies. Other suitable reference trip requirements can be included in the preceding list.

A driver profile preferably addresses several driver characteristics that positively or negatively affect vehicle fuel consumption, preferably including but not limited to: (11-1) rapid (as opposed to normal) acceleration away from a vehicle stop; (11-2) rapid braking as a vehicle approaches a vehicle stop, which substantially reduces the benefits of regenerative braking in an electric vehicle; (11-3) slower-than-normal braking as a vehicle approaches a vehicle stop, which can enhance the benefits of regenerative braking; (11-4) habitual vehicle operation at speeds greatly exceeding an optimal speed for that vehicle (where fuel mileage is maximized) or greatly exceeding posted speed limits (which may require rapid braking to respond to an unexpected event); and (11-5) habitual vehicle operation at a speed that varies widely, where the road and local environment allow constant speed operation.

A driver profile for a given vehicle driver may be generated by having the driver repeatedly execute a sequence of specified maneuvers in varying environments. The driver's responses in executing the specified maneuvers are recorded and later analyzed to assign a numerical level $L_n$ of 1–10, for example, for each of several driver characteristics, such as (11-n) (n=1, 2, . . . , N) in the preceding discussion. The level $L_n$ assigned to each characteristic is weighted by a fraction $f_n$ ($0<f_n<1$) according to the relation $$L = \sum_{n=1}^{N} f_n L_n, \quad (21)$$

$$\sum_{n=1}^{N} f_n = 1. \quad (22)$$

The averaged level L is optionally used for the driver profile trip condition (11) discussed in the preceding discussion. Preferably, however, the individual levels $L_n$ are received by the system and used directly to estimate fuel consumption. Driver's profile information, represented by the levels $L_n$, that is collected for one vehicle may be used as a first approximation for the corresponding driver's profile information to be used on another vehicle. However, the driver's profile information may vary somewhat with the vehicle used for the trip.

Driver's profile information is collected by testing for each of a number of driver's profile characteristics as described above, then analyzed to determine the level $L_n$ assigned to a characteristic (number n), then optionally used to assign an overall level L, then used to help estimate FC(R) for fuel consumption for a trip with a selected trip route R, or FC for a "routeless" or "destinationless" approach as described in the following. The weights $f_n$ used to determine an overall level L for the driver's profile may vary with the type of route R chosen for the trip.

The reference fuel consumption value FC0(R) is modified, by addition to this value, to compensate for: (1') terrain along the route R that has an upward slope with slope magnitude above the slope threshold; (2') use of vehicle fuel that provides substantially less than the specified reference mileage; (3') use of vehicle tires that are substantially worn or non-standard (can result in addition to or subtraction from FC0(R)); (4') tire pressure far from its optimal value; (5') poor roadbed condition; (6') expected vehicle velocity that will lie outside the specified optimal range; (7') vehicle traffic along the route R that is expected to be heavy or very heavy; (8') expected use of specified vehicle accessories during the trip; (9') expected presence of a strong head wind over part or all of the route R; (10') expected non-normal weather characteristics, such as rain, sleet, snow, ice, blizzard, etc.; and (11') non-normal driver profile characteristics, such as rapid acceleration away from a vehicle stop, rapid braking at a vehicle stop (which reduces benefits of regenerative braking) and/or habitual vehicle operation at speeds greatly exceeding optimal vehicle speed and/or posted speed limits.

The reference fuel consumption value FC0(R) is modified, by subtraction from this value, to compensate for: (1") terrain along the route R that has an downward slope with slope magnitude above the slope threshold; (2") use of vehicle fuel that provides substantially greater than the specified reference mileage; (9") anticipated presence of a strong tail wind over part or all of the route R; and (11") driver profile that enhances the benefits of regenerative braking. The net estimated fuel consumption for the route R becomes $$FC(R) = FC0(R) + (\text{additions}) - (\text{subtractions}), \quad (23)$$

where the addition FC increments correspond to the additive conditions, such as (1')–(10'), and the subtraction FC increments correspond to the subtractive conditions, such as (1", (2"), (9") and (11"). Equation (23) may be calculated for the entire route R or, alternatively, may be calculated for each of two or more groups of road segments that together make up the route R.

A fuel increment or "cost" table $\Delta FC(\phi;R)$, illustrated in brief format in FIG. 5, for each deviation of a trip condition $\phi$ from its "normal" condition is prepared and provided for use by the system. This table is then used to determine each fuel increment value $\Delta FC(\phi;R)$ to be included in an addition to or subtraction from the reference value FC0(R) according to Eq. (23).

Figure 6:
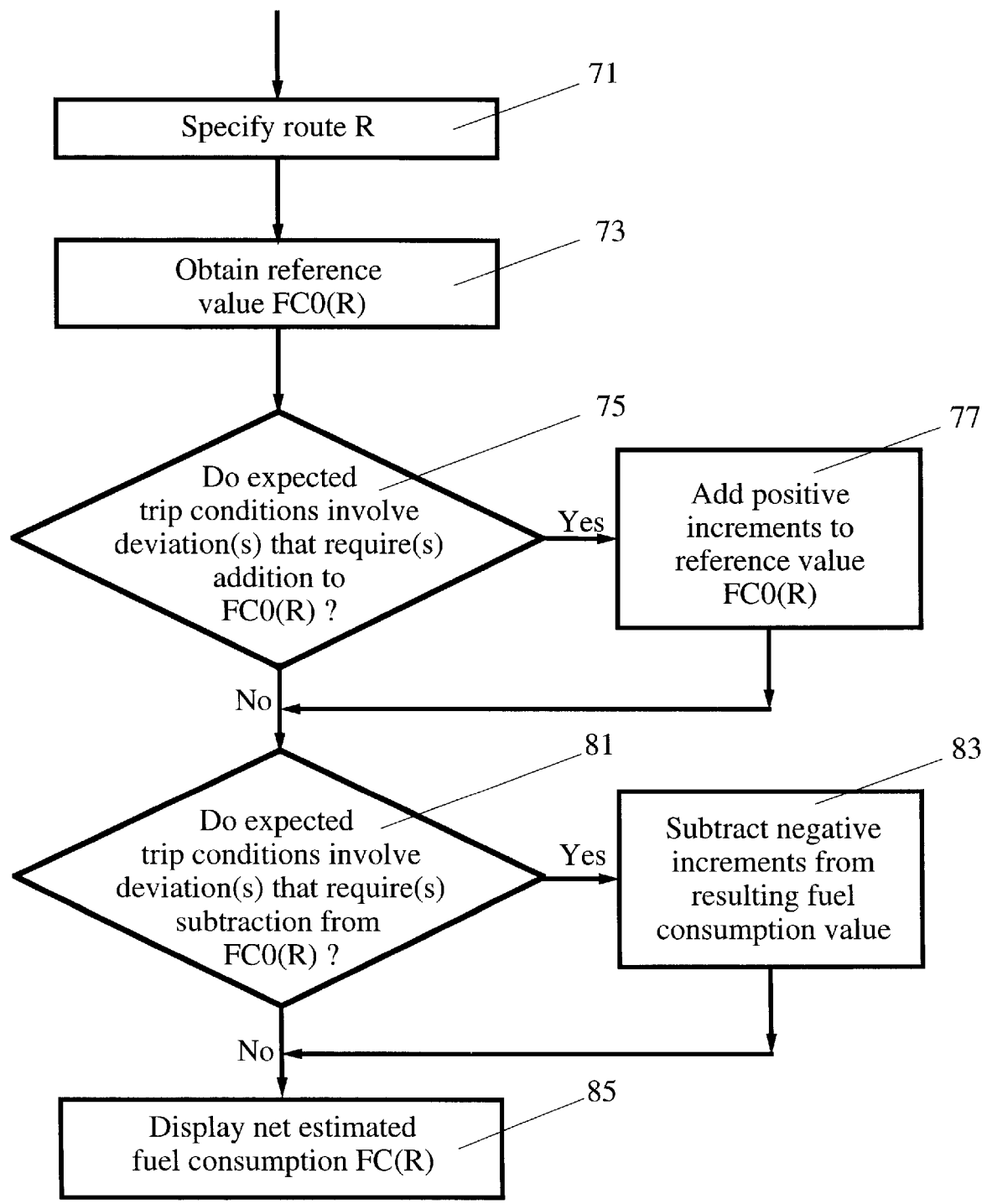

FIG. 6 is a flow chart of a suitable procedure for estimating fuel consumption of a given route according to the preceding reference mileage approach. In step 71, a route R is specified for a trip. In step 73, a reference fuel consumption value FC0(R) is obtained for that route. In step 75, the system determines whether the expected trip conditions will involve one or more deviations from the reference list requirements that require an addition to the reference value FC0(R)? If the answer to the question in step 75 is "yes," the system determines each additive condition (e.g., from the preceding list (1')–(11')) and adds the corresponding positive increments to the reference value, in step 77, and proceeds to step 81. If the answer to the question in step 75 is "no," the system proceeds to step 81.

In step 81 of FIG. 6, the system determines whether the expected trip conditions will involve one or more deviations from the reference list requirements that require a subtraction from the reference value FC0(R)? If the answer to the question in step 81 is "yes," the system determines each subtractive condition (e.g., from the preceding list (1"), (2"), (9") and (11")) and subtracts the corresponding negative increments from to the resulting fuel consumption value (present at step 81), in step 83, and proceeds to step 85. If the answer to the question in step 81 is "no," the system proceeds to step 85. In step 85, the system optionally displays, visually or audibly or both, the net predicted fuel consumption value, FC(R), computed according to Eq. (23).

The approach illustrated in FIG. 6 may be used in modified form in the following manner, shown in flow chart form in FIG. 7. In step 91, a route R is specified for a trip. In step 93, the system determines whether the expected trip conditions will involve one or more deviations from the reference list requirements that require an addition to, or subtraction from, the reference fuel consumption value? If the answer to the question in step 93 is "yes," the system computes each addition to and/or subtraction from the reference fuel consumption value, in step 95 and optionally stores these incremental FC values. Optionally, the system also uses these incremental FC values $\Delta FC(\phi;R)$ to predict the fuel consumption for the trip, or for a selected portion of the trip, using Eq. (23).

The vehicle then proceeds along the route R and records actual fuel consumption for various portions or road segments of the route. At a selected location along the route, a vehicle occupant (driver or passenger) may interrogate the system and request a change in the deviations $\phi$ from normal trip conditions that were taken account of in determining the fuel consumption value FC(R) in Eq. (23). For example, an expected weather condition, such as rain or a clear sunny day, may have changed to another corresponding weather condition that requires an addition to or subtraction from the preceding computed FC(R) value, for either the remainder of the route R or for the remainder of the route plus a selected portion of the route already covered. As another example, one or more vehicle accessories, such as air conditioning or an open vehicle window, expected to be used on the trip may be disengaged, or one or more vehicle accessories, such as space heating, that were not accounted for in computing the FC(R) value may have to be used in response to changed conditions. These changes in trip conditions may include generally controllable or volitional changes in trip conditions, such as (2), (3), (4), (6), (8) and (11) discussed in connection with Eq. (23), and may include generally uncontrollable changes in trip conditions, such as (1), (5), (7), (9) and (10).

Figure 7:
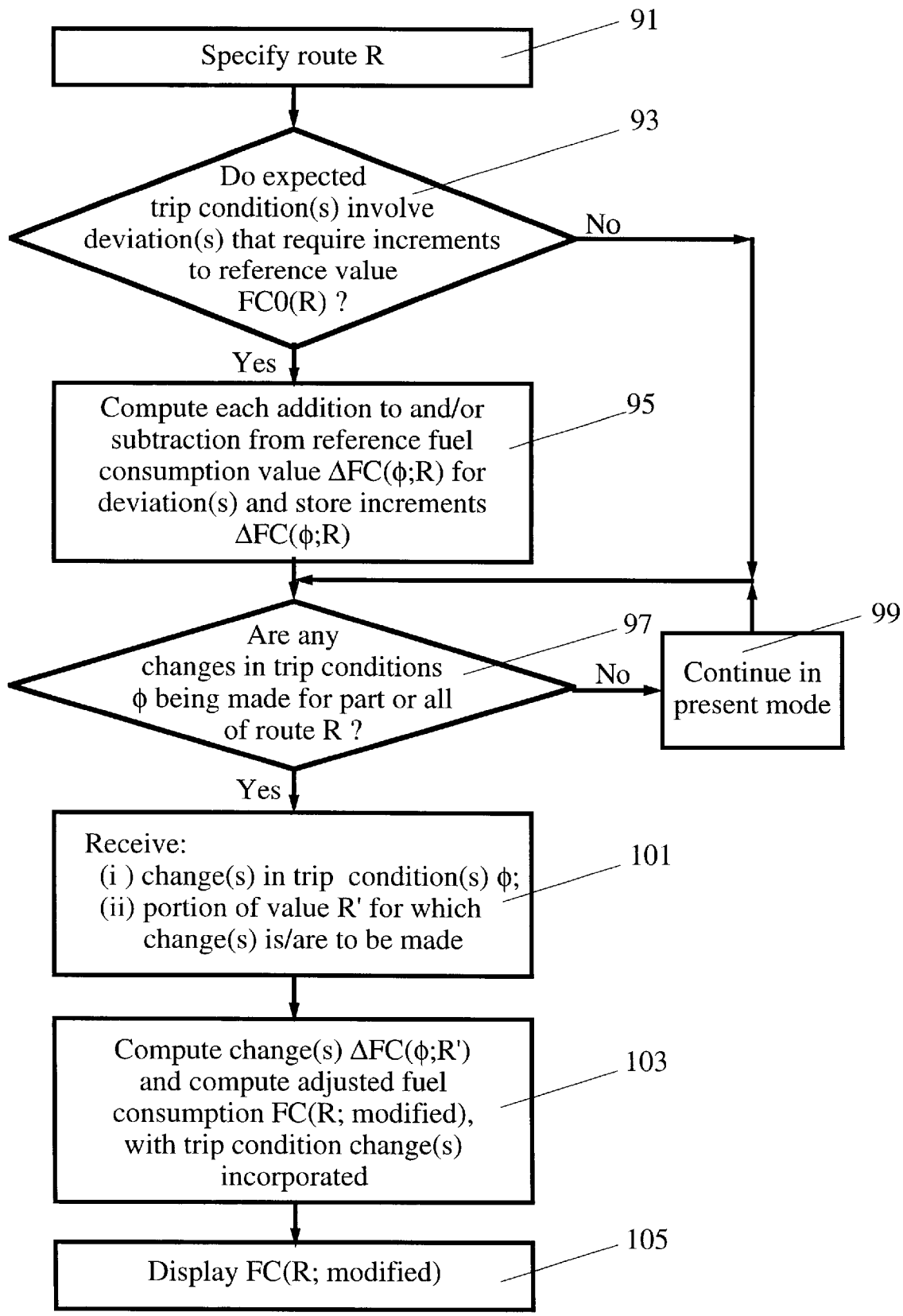

In step 97 of FIG. 7, the system determines if any changes in trip conditions φ are to be made, either for the remainder R' of the route R or for some other specified portion of the route R? If the answer to the question in step 97 is "no," the system continues in its present mode, in step 99, until an inquiry is again made in step 97. If the answer to the question in step 97 is "yes," the system receives, in step 101, a specification of (i) the change(s) in trip condition(s) φ to be made and (ii) the portion of the route for which these changes are to be made. In step 103, fuel consumption increments ΔFC(φ;R') are computed for each change in a trip condition φ, and a modified estimated fuel consumption ΔFC(R;modified) is computed with the trip condition change(s) incorporated. In step 105, the system optionally displays, in visually perceptible form and/or audibly perceptible form, the modified estimated value, FC(R;modified), for fuel consumption for the entire trip, or for the portion of the trip yet to be traveled. The difference between the original estimation, FC(R), and the modified estimated value, FC(R;modified, can be positive, negative or zero, depending upon the changes and upon the portion of the route for which these changes apply.

In another approach, referred to as a "routeless" approach, a directory of entries of normalized fuel usage versus "trip" is developed, where a "trip" is specified only by origin and destination—a particular route is not specified. In predicting fuel usage for a particular route, the user begins with a normalized/routeless fuel usage for a trip (specified by the corresponding origin and destination) and modifies the prediction, where appropriate, based on date/time of departure, proposed route, if known, and whichever of the variables tire condition, tire air pressure, expected traffic density, expected weather conditions, vehicle accessories expected to be used, vehicle driver profile, etc. are available for entry. The system computes predicted fuel usage based on modifications from the normalized/routeless fuel usage value. If the normalized/routeless predicted fuel usage can be broken down into corresponding values for two or more "trip" components or segments, each with its own origin and destination, a more accurate prediction can be made by replacing the normalized/routeless fuel usage prediction by actual fuel usage for that "trip" segment, by estimating a difference between actual and estimated fuel usage for one or more other trip segments, and by using these differences to estimate a difference in fuel consumption for the entire trip, using linear proportions or other suitable computations.

Figure 8:
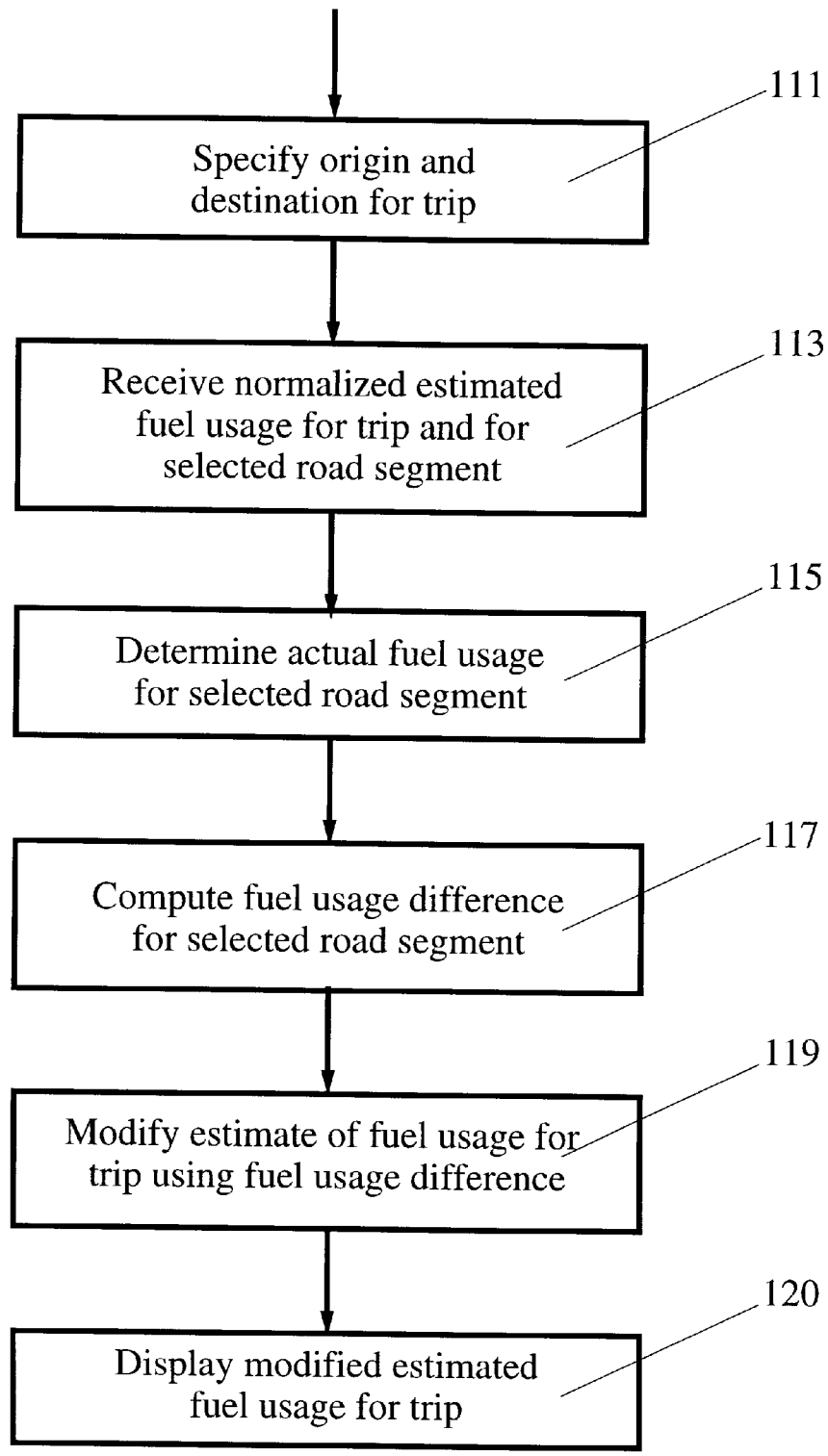

FIG. 8 is a flow chart illustrating how the "routeless" approach can be used to estimate fuel consumption. In step 111, the origin and destination of a trip are specified. In step 113, the system obtains or receives a normalized estimated fuel consumption value for the trip and for a selected road segment used in determining this estimated value. In step 115, the system determines, enroute, the actual fuel usage for the selected road segment. In step 117, the system determines a fuel usage difference value between the estimated and actual fuel usage for the selected road segment. In step 119, the system uses the fuel usage difference value to modify the estimated fuel usage for the trip. In step 120, the system optionally displays, visually or audibly or both, the modified estimated fuel usage for the trip.

In a modification of this approach, called a "destinationless" approach, the vehicle is chosen rout the trip origin to a first trip destination along a chosen route R(chosen), and the system notes the weather, terrain, road slopes, vehicle average velocity and other trip conditions encountered along the route R(chosen). The chosen route and the destination are not explicitly entered into the system by a vehicle occupant. The system then estimates fuel consumption for a return trip using a reverse route R(chosen;rev) that coincides with R(chosen) but is oriented in the reverse direction. The return trip fuel consumption estimation process takes account of the positive and negative road slopes in the route R(chosen;rev), based on the negative and positive slopes encountered in the chosen route R(chosen). For example, if the initial half of the trip uses a chosen route R(chosen) in which all road segments have either zero slope or negative slope, estimated fuel consumption from the first destination to a second destination (origin) for the return trip will be higher, by a calculable amount, than actual or estimated fuel consumption for the trip from the origin to the first destination.

Figure 9:
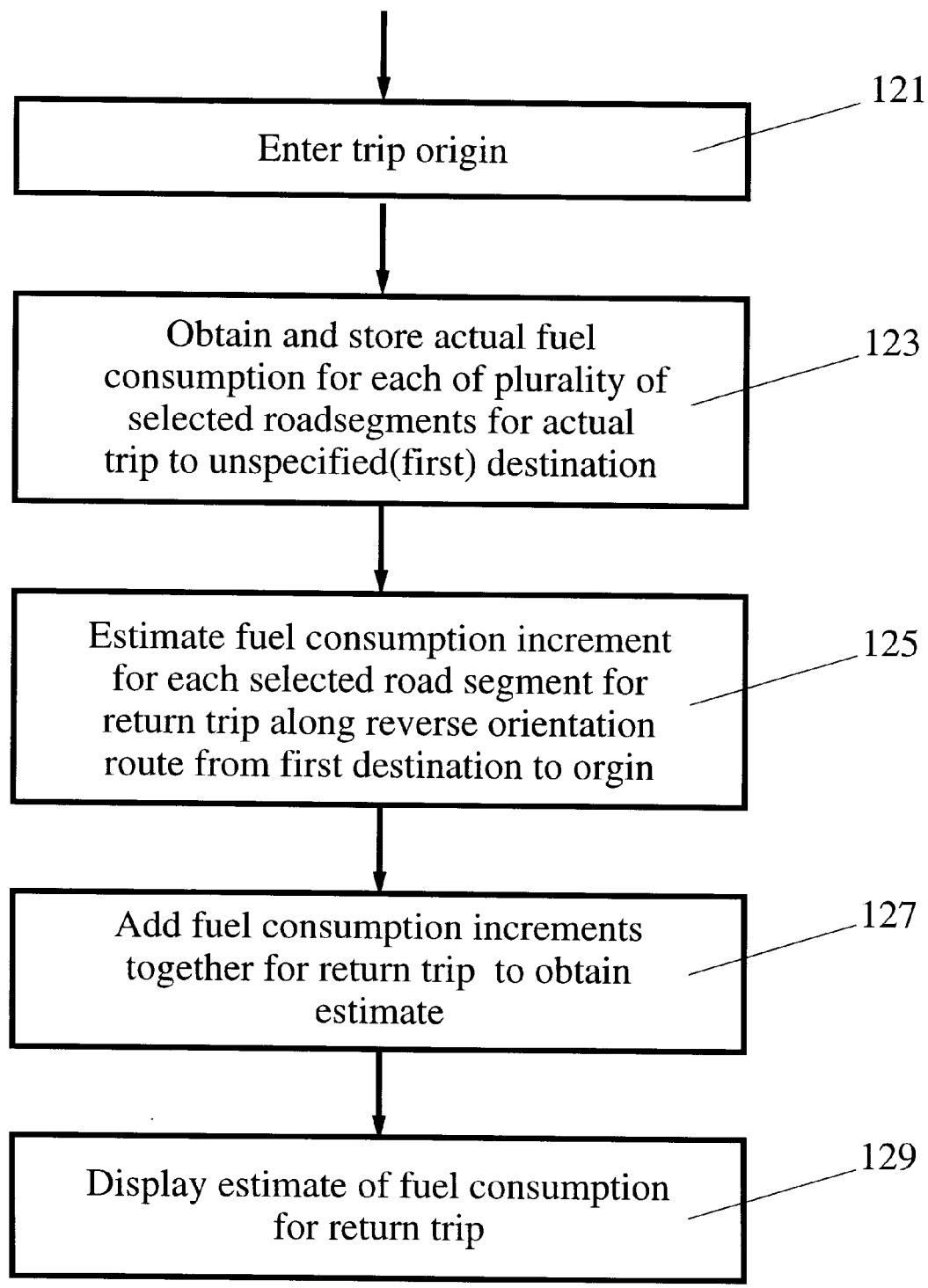

FIG. 9 is a flow chart illustrating this "destinationless" approach. In step 121, the origin of a trip is entered; or the trip origin can be automatically entered using a location determination unit that is carrier in or on the vehicle. In step 123, the system obtains or receives and stores the actual fuel consumption for each of a plurality of selected road segments (preferably for the entire unspecified route) for an actual trip from the specified origin to an unspecified (first) destination. In step 125, the system estimates the fuel consumption increment for each of the selected road segments, for a trip oriented in the reverse direction, using the actual fuel consumption measured for the trip from the origin to the (first) destination. In step 127, the fuel consumption increments determined in step 125 are added together to estimate the fuel consumption for the return trip along the reverse orientation route, FC(R;return). In step 129, the system optionally displays, visually or audibly or both, the modified estimated fuel usage for the return trip.

A protocol for testing fuel consumption for an electric vehicle is set forth in SAE J1634, issued in revised form by the Society of Automotive Engineers, Inc. in June 1995. According to this protocol, a passenger vehicle is to be tested carrying its curb weight (empty) plus 136 kilograms, and a truck weighing over about 2700 kilograms is to be tested carrying its curb weight plus half of its maximum payload. A dynamometer, accurate to within 0.5 percent, is to be used to measure vehicle speed, and vehicle speed is integrated over time to determine distance traveled. A test cycle, having a duration of 1372 seconds and covering a distance of 12 kilometers (km) at an average velocity of 31.5 km per hour, is to be used to evaluate city driving; and a test cycle, having a duration of 764 seconds and covering a distance of 16.4 km at an average velocity of 77.8 km per hour, is to be used to evaluate highway driving. The speed tolerance is ±3.2 km per hour, measured from the maximum or minimum registered velocity. Energy or fuel consumption is tested at constant velocity and in a coastdown phase, using protocols set forth in SAE J1263 for hydrokinetic dynamometers and using protocols set forth in SAE J2263/2264 for electric dynamometers. Regenerative braking, if present, is disabled during coastdown testing. A separate protocol for testing the effects of regenerative braking in an electric vehicle, set forth in SAE J1634, takes approximate account of the effects of the vehicle form factor (viewed from the front) and vehicle mass on electric charge regeneration during coastdown. These protocols are useful for comparison purposes and might be used to predict normalized fuel consumption for an electric vehicle, whose use is discussed in the preceding. However, normalized fuel consumption should be further refined by reference to expected route and traffic conditions, expected weather conditions and vehicle driver profile, in order to provide a reasonably accurate prediction of fuel consumption by an electric vehicle over the selected route at the selected date and time.

Figure 10:
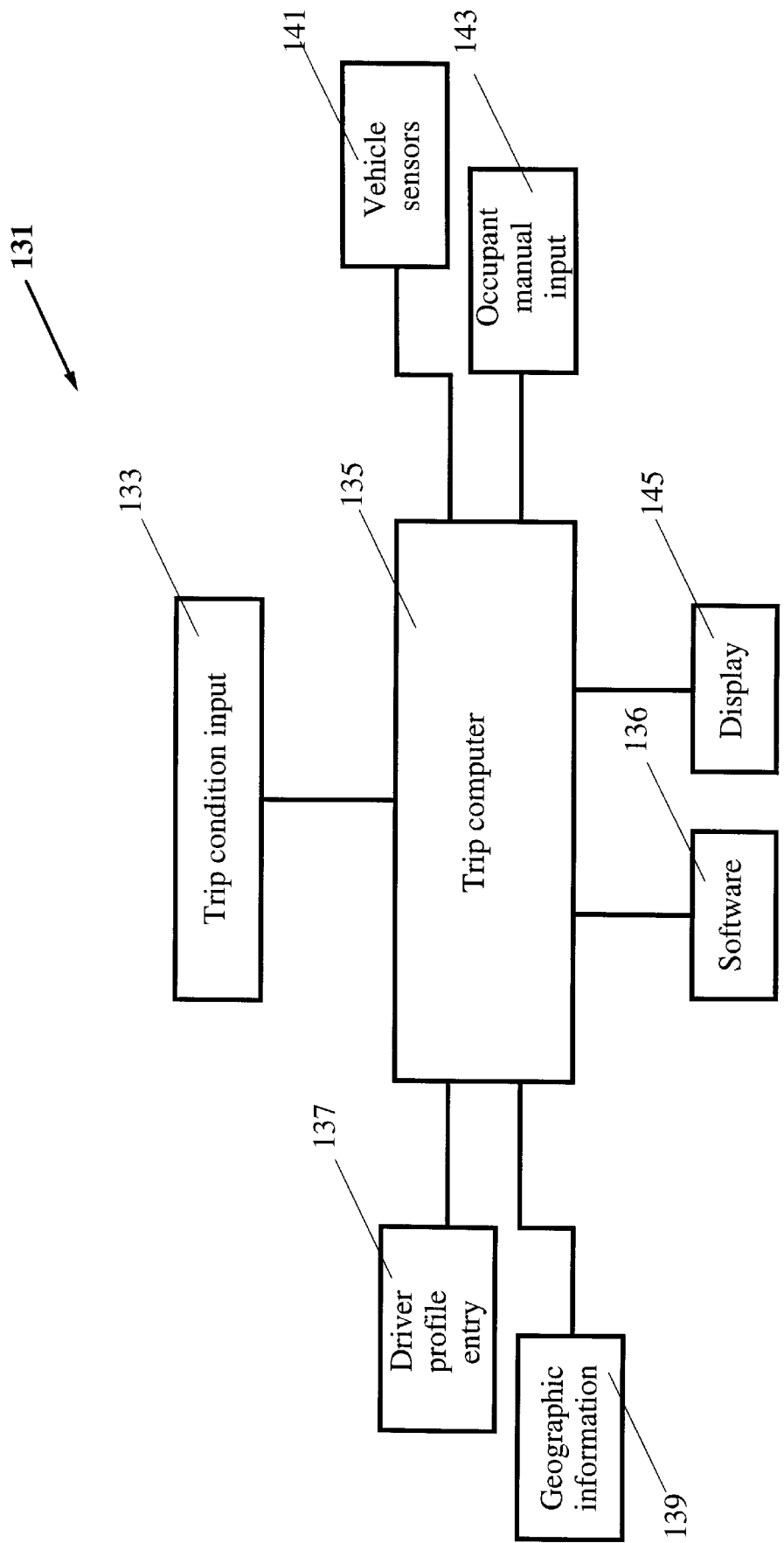
FIG. 10 is a schematic view of apparatus suitable for practicing the invention.

FIG. 10 is a schematic view of apparatus 131 suitable for practicing the invention. The apparatus 131 includes a vehicle trip condition input module 133, which includes a keyboard or other suitable information input means for entering trip condition data into a trip computer 135. The trip computer 135 receives manually or electronically entered information from a driver profile entry module 137 (optional), from a geographic information module 139, from one or more vehicle sensors 141 (optional) and from a vehicle occupant manual input module 143 (optional). The apparatus 131 optionally includes a display module 145 for visual display and/or audible display of information on a route or portion of a route and for display of estimated fuel consumption for a route or portion of a route.

The geographic information module 139 includes a location determination (LD) unit, such as an LD signal antenna and LD signal receiver/processor that receive and process signals from LD signal sources, such as a Global Positioning System (GPS), a Global Orbiting Navigational Satellite System (GLONASS), a Low Earth Orbit (LEO) System or a ground-based LORAN System. The geographic information module 139 also includes one or more terrain maps in electronic format for selected geographic regions, preferably including one or more maps representing vertical coordinate versus (two) horizontal coordinates for these regions. This software may include a program such as TOPO! Interactive Maps, which provides topographical maps on a CD ROM in electronic format and for visual display, for use in determining user elevation at different locations along a selected route R. TOPO! is available from Wildflower Productions (info@topo.com on the Internet).

The trip computer 135 includes a software module 136, including application software that uses route information, vehicle trip information, sensed or measured actual trip information and vehicle occupant preferences (entered through the manual input module 143) to estimate fuel consumption for a selected route or for a selected origin and destination according to the invention described in the preceding discussion. The software module 136 includes application software that determines the elevation or vertical coordinate of a location, where the horizontal coordinates of the location are specified; or this application software can be included in the geographic information module 139. The software module 136 optionally includes a software application that receives driver's profile information and uses this information to help estimate the fuel consumption for a given trip.

Where a trip along a selected route is contemplated, a vehicle occupant or someone acting on the occupant's behalf will enter the route into a trip processor or computer and will answer one or more of a sequence of questions concerning the route, expected traffic conditions, expected weather conditions and the driver, including: (1) name of, and other relevant personal details on, the driver (used to determine the appropriate driver's profile to be used; (2) date and estimated time of departure; (3) route R to be used; (4) vehicle fuel to be used; (5) vehicle tire condition (6) vehicle tire pressure at start of trip; (7) expected roadbed conditions; (8) expected vehicle average velocity, if known, for the trip; (9) expected level of vehicle traffic, if known, along the route (e.g., light, moderate, heavy, very heavy); (10) vehicle accessories expected to be used on the trip; (11) wind and wind direction, if known, expected to be encountered along the route; (12) ambient weather conditions, if known, expected to be encountered along the route; and (13) driver's profile information, if not already entered into the system memory.

The LD system carried on the vehicle periodically determines the location of the vehicle along the chosen route, at a rate of between once per second and once per 120 seconds. Preferably, the LD system also advises the driver if the vehicle has departed substantially from the initially selected route, for example, where the vehicle is forced to follow a detour route that does not closely approximate the selected route. At such point, the vehicle driver may (1) seek to return to the selected route, (2) determine the amount of fuel already consumed for the portion of the route already completed, and (3) estimate the amount of fuel that will be consumed over the remainder of the trip, using an enroute computation as described in the preceding discussion.

The LD signals 23A, 23B, 23C, 23D (FIG. 1) may be received by the LD signal antenna 19 and LD signal receiver 21 from a plurality of satellite-based location determination (LD) signal sources 25A, 25B, 25C, 25D that are, for example, part of a Satellite Positioning System, such as GPS, GLONASS or LEO. Receipt and processing of GPS and GLONASS signals are discussed by Tom Logsdon, *The Navstar Global Positioning System*, Van Nostrand Reinhold, New York, 1992, pp. 1–90 and 115–119.

Alternatively, the LD signals 23A, 23B, 23C, 23D may be received from a plurality of ground-based LD signal sources 25A, 25B, 25C, 25D that are, for example, part of a ground-based system such as Loran. A representative LORAN-C system is discussed in *LORAN-C User Handbook*, Department of Transportation, U.S. Coast Guard, Commandant Publication P16562.5, Nov. 18, 1992 (ISBN 0-16-041594-2), and by Magee et al in U.S. Pat. No. 3,665,086. Other LD signal sources can be used here.

I claim:

1. A method for estimation of fuel consumption by a vehicle in traveling from a first location to a second location, the method comprising the steps of:

receiving information on a selected trip route to be traveled by a vehicle on a trip in moving from a first selected location to a second selected location within a selected time interval, where the trip route comprises one or more selected road segments;

receiving a reference fuel consumption value representing estimated fuel consumption for the trip route for a reference set of conditions for the trip;

for at least one road segment on the trip route, receiving information on at least one of the following route information items concerning the trip route and selected time interval: (1') whether the road segment includes terrain with an upward slope having a slope magnitude that is greater than a selected slope threshold; (2') whether the fuel used by the vehicle will provide vehicle mileage that is substantially less than a reference fuel mileage; (3') whether the condition of tires used by the vehicle differ substantially from a condition of new vehicle tires; (4') whether the tire air pressure differs substantially from optimal air pressure; (5') whether the condition of the roadbed for the road segment is substantially less than normal quality; (6') whether an expected average vehicle velocity will lie outside a selected optimal vehicle velocity range; (7') whether vehicle traffic along the road segment will be substantially heavier than average vehicle traffic for that road segment; (8') whether any of a selected group of vehicle accessories will be activated while the vehicle is traveling on the road segment; (9') whether the vehicle is expected to encounter a strong head wind on the road segment; (10') whether the weather encountered on the road segment is expected to include non-normal weather conditions; and (11') whether the driver profile for the person who will operate the vehicle on the road segment differs substantially in a negative sense from a selected reference driver profile;

when at least one of the questions (1'), (2'), (3'), (4'), (5'), (6'), (7'), (8'), (9'), (10') and (11') is answered affirmatively, selecting a positive fuel consumption increment corresponding to the question that is answered affirmatively;

for the at least one road segment on the trip route, receiving information on at least one of the following route information items concerning the trip route and selected time interval: (1") whether the road segment includes terrain with a downward slope having a slope magnitude that is greater than a selected slope threshold; (2") whether the fuel used by the vehicle will provide vehicle mileage that is substantially greater than a reference fuel mileage; (9") whether the vehicle is expected to encounter a strong tail wind on the road segment; and (11") whether the driver profile for the person who will operate the vehicle on the road segment differs substantially in a positive sense from a selected reference driver profile;

when at least one of the questions (1"), (2"), (9") and (11") is answered affirmatively, selecting a negative fuel consumption increment corresponding to the question that is answered affirmatively; and estimating fuel consumption for the trip as a sum of the reference fuel consumption value, plus each selected positive fuel consumption increment, minus each selected negative fuel consumption increment that represents an estimate of fuel consumption for the vehicle trip over the trip route.

2. The method of claim 1, further comprising the step of selecting said vehicle fuel for consumption from the class of fuels consisting of electrical charge, gasoline, kerosene, natural gas and diesel fuel.

3. A method for estimation of fuel consumption by a vehicle in traveling from a first location to a second location, the method comprising the steps of:

receiving information on estimated fuel usage for a trip to be made by a vehicle in moving from a first selected location to a second selected location, where the route to be followed in making the trip is not specified;

for a selected road segment that will be traveled by the vehicle in making the trip, receiving information on estimated fuel usage for the selected road segment;

determining actual fuel usage for the selected road segment;

computing a fuel usage difference between the actual fuel usage and estimated fuel usage for the selected road segment; and modifying the estimated fuel usage for the trip, using the fuel usage difference for the selected road segment.

4. The method of claim 3, further comprising the step of selecting said fuel for consumption from the class of fuels consisting of electrical charge, gasoline, kerosene, natural gas and diesel fuel.

5. A method for estimation of fuel consumption by a vehicle in traveling from one location to another location, the method comprising the steps of:

receiving information on actual fuel usage, for each of a plurality of selected road segments that comprise a trip route, for a trip made by a vehicle in moving from a selected first location to a second location along the trip route, where the trip route followed in making the trip and the second location are not initially specified;

for each of the selected road segments, receiving information on at least one of the following trip information items as the vehicle moves from the trip route from the first location to the second location: a representative altitude of the road segment; a representative altitude of the road segment; a representative slope of the road segment; a speed limit that is effective for the road segment; an expected vehicle average speed along the road segment; length of the road segment; condition of the road segment; condition of the vehicle tires; vehicle tire air pressure; vehicle fuel used; expected vehicle traffic density along the road segment; applicable constraints on vehicle operation along the road segment; expected ambient weather conditions along the road segment; selected vehicle accessories that will be used on a portion or all of the trip route; a time interval during which the trip will be made; and vehicle driver profile information;

for each of the selected road segments, estimating vehicle fuel consumption for the road segment oriented in a reverse direction, using the actual fuel usage for the road segment and from the information on the at least one trip information item received for the road segment; and estimating vehicle fuel consumption for a return trip from the second location to the first location along a return trip route, which is comprised of the selected road segments oriented in a reverse direction, as a sum of the estimated fuel consumption for each of the selected road segments oriented in the reverse direction.

6. The method of claim 5, further comprising the step of selecting said fuel for consumption from the class of fuels consisting of electrical charge, gasoline, kerosene, natural gas and diesel fuel.

7. Apparatus for estimation of fuel consumption by a vehicle in traveling from a first location to a second location, the apparatus comprising:

a microprocessor that is programmed:

to receive information on a selected trip route to be traveled by a vehicle on a trip in moving from a first selected location to a second selected location within a selected time interval, where the trip route is comprised of one or more road segments;

to receive a reference fuel consumption value representing estimated fuel consumption for the selected trip route for a reference set of conditions for the trip;

for at least one road segment on the selected trip route, to receive information on at least one of the following route information items concerning the selected trip route and selected time interval: (1') whether the road segment includes terrain with an upward slope having a slope magnitude that is greater than a selected slope threshold; (2') whether the fuel used by the vehicle will provide vehicle mileage that is substantially less than a reference fuel mileage; (3') whether the condition of tires used by the vehicle differ substantially from a condition of new vehicle tires; (4') whether the tire air pressure differs substantially from optimal air pressure; (5') whether the condition of the roadbed for the road segment is substantially less than normal quality; (6') whether an expected average vehicle velocity will lie outside a selected optimal vehicle velocity range; (7') whether vehicle traffic along the road segment will be substantially heavier than average vehicle traffic for that road segment; (8') whether any of a selected group of vehicle accessories will be activated while the vehicle is traveling on the road segment; (9') whether the vehicle is expected to encounter a strong head wind on the road segment; (10') whether the weather encountered on the road segment is expected to include non-normal weather conditions; and (11') whether the driver profile for the person who will operate the vehicle on the road segment differs substantially in a negative sense from a selected reference driver profile;

when at least one of the questions (1'), (2'), (3'), (4'), (5'), (6'), (7'), (8'), (9'), (10') and (11') is answered affirmatively, to select a positive increment corresponding to the question that is answered affirmatively;

for the at least one road segment on the selected trip route, to receive information on at least one of the following route information items concerning the selected trip route and selected time interval: (1") whether the road segment includes terrain with a downward slop having a slope magnitude that is greater than a selected slope threshold; (2") whether the fuel used by the vehicle will provide vehicle mileage that is substantially greater than a reference fuel mileage; (9") whether the vehicle is expected to encounter a strong tail wind on the road segment; and (11") whether the driver profile for the person who will operate the vehicle on the road segment differs substantially in a positive sense from a selected reference driver profile;

when at least one of the questions (1"), (2"), (9") and (11") is answered affirmatively, to select a negative increment corresponding to the question that is answered affirmatively; and to estimate fuel consumption for the trip route as a sum of the reference fuel consumption value, plus each selected positive increment, minus each selected negative increment that represents an estimate of fuel consumption for the vehicle trip over the selected trip route.

8. Apparatus for estimation of fuel consumption by a vehicle in traveling from a first location to a second location, the apparatus comprising a microprocessor that is programmed:

to receive information on estimated fuel usage for a trip to be made by a vehicle in moving from a first selected location to a second selected location, where the trip route to be followed in making the trip is not specified;

for a selected road segment that will be traveled by the vehicle in making the trip, to receive information on estimated fuel usage for the selected road segment;

to determine actual fuel usage for the selected road segment;

computing a fuel usage difference between the actual fuel usage and estimated fuel usage for the selected road segment; and to modify the estimated fuel usage for the trip, using the fuel usage difference for the selected road segment.

9. Apparatus for estimation of fuel consumption by a vehicle in traveling from one location to another location, the apparatus comprising a microprocessor that is programmed:

to receive information on actual fuel usage, for each of a plurality of selected road segments that comprise a trip route, for a trip made by a vehicle in moving from a selected first location to a second location along the trip route, where the trip route followed in making the trip and the second location are not initially specified;

for each of the selected road segments, to receive information on at least one of the following trip information items as the vehicle moves from the trip route from the first location to the second location: a representative altitude of the road segment; a representative altitude of the road segment; a representative slope of the road segment; a speed limit that is effective for the road segment; an expected vehicle average speed along the road segment; length of the road segment; condition of the road segment; condition of the vehicle tires; vehicle tire air pressure; vehicle fuel used; expected vehicle traffic density along the road segment; applicable constraints on vehicle operation along the road segment; expected ambient weather conditions along the road segment; selected vehicle accessories that will be used on a portion or all of the trip route; a time interval during which the trip will be made; and vehicle driver profile information;

for each of the selected road segments, to estimate vehicle fuel consumption for the road segment oriented in a reverse direction, using the actual fuel usage for the road segment and from the information on the at least one trip information item received for the road segment; and to estimate vehicle fuel consumption for a return trip from the second location to the first location along a return trip route, which is comprised of the selected road segments oriented in a reverse direction, as a sum of the estimated fuel consumption for each of the selected road segments oriented in the reverse direction.

10. A method for obtaining driver's profile information for use in estimating vehicle fuel consumption for a trip along a selected route, the method comprising the steps of:

measuring and evaluating a selected driver's responses in a selected vehicle in selected vehicle maneuvers, including at least one of the following: (1) whether the driver accelerates rapidly or slowly away from a vehicle stop; (2) whether the driver brakes rapidly or slowly as the vehicle approaches a vehicle stop; (3) whether the driver habitually operates the vehicle at speeds that greatly exceed a vehicle optimal speed at which vehicle fuel mileage is maximized; and (4) whether the driver operates the vehicle on a road at a speed that varies widely, where the road and local environment allow substantially constant vehicle speed operation; and assigning a numerical value for a driver's profile level to each of the selected driver's responses, where the numerical value varies from a selected minimum value to a selected maximum value.

* * * * *